United States Patent
Kim et al.

(10) Patent No.: US 10,680,536 B2
(45) Date of Patent: Jun. 9, 2020

(54) FIBROUS ENERGY HARVESTING DEVICE HAVING CORRUGATED STRUCTURE AND WEARABLE ITEM INCLUDING THE SAME

(71) Applicant: Industry-Academic Cooperation Foundation, Chosun University, Gwangju (KR)

(72) Inventors: Youn Tae Kim, Daejeon (KR); A Young Choi, Gwangju (KR); Chang Jun Lee, Gwangju (KR); Ji Won Park, Gwangju (KR); Do Gyun Kim, Jeollanam-do (KR)

(73) Assignee: Industry-Academic Cooperation Foundation, Chosun University, Gwangju (KR)

( * ) Notice: Subject to any disclaimer, the term of this patent is extended or adjusted under 35 U.S.C. 154(b) by 316 days.

(21) Appl. No.: 15/623,437

(22) Filed: Jun. 15, 2017

(65) Prior Publication Data
US 2018/0123482 A1   May 3, 2018

(30) Foreign Application Priority Data
Oct. 31, 2016   (KR) .......................... 10-2016-0143542

(51) Int. Cl.
*H02N 1/04*   (2006.01)
*H02N 1/00*   (2006.01)

(52) U.S. Cl.
CPC .................................. *H02N 1/04* (2013.01)

(58) Field of Classification Search
CPC .................................. H02N 1/04; H02N 1/00
See application file for complete search history.

(56) References Cited

U.S. PATENT DOCUMENTS

| | | | |
|---|---|---|---|
| 6,493,933 B1 * | 12/2002 | Post | H01L 23/4985 257/E23.065 |
| 9,887,644 B2 * | 2/2018 | Kim | H02N 1/04 |
| 9,906,170 B2 * | 2/2018 | Choi | H02N 1/04 |
| 2013/0020909 A1 * | 1/2013 | Kim | H02N 2/18 310/339 |
| 2016/0344308 A1 * | 11/2016 | Wang | H02N 1/04 |
| 2016/0373028 A1 * | 12/2016 | He | H02N 1/04 |
| 2017/0370352 A1 * | 12/2017 | Fujita | B81B 5/00 |

FOREIGN PATENT DOCUMENTS

| | | |
|---|---|---|
| KR | 10-1538082 B1 | 7/2015 |
| KR | 10 2016 0024643 | 3/2016 |
| WO | WO-2014193182 A1 * | 12/2014 |

OTHER PUBLICATIONS

Su et al., "Hybrid triboelectric nanogenerator for harvesting water wave energy and as a self-powered distress signal emitter", 2014.*

* cited by examiner

*Primary Examiner* — Edgardo San Martin
(74) *Attorney, Agent, or Firm* — Renner, Otto, Boisselle & Sklar, LLP

(57) ABSTRACT

A fibrous energy harvesting device having a corrugated structure includes a first fiber layer acting as an electrified body for generation of triboelectric energy, and a second fiber layer acting as an electrified body for generation of triboelectric energy. The first fiber layer is attached to an upper surface of the second fiber layer and has a corrugated structure.

8 Claims, 4 Drawing Sheets

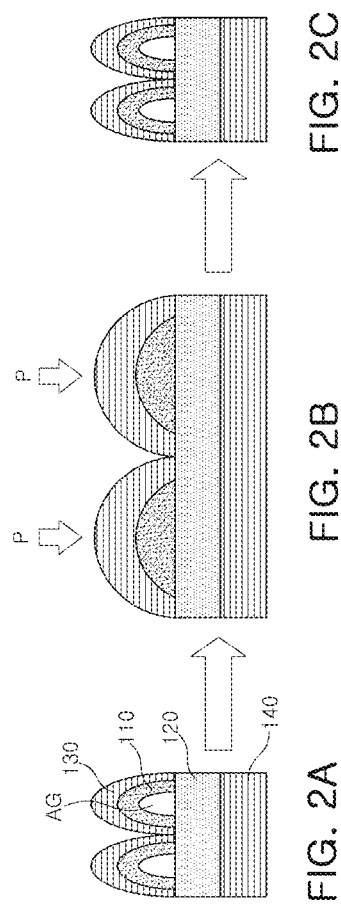

FIBROUS ENERGY HARVESTING DEVICE HAVING CORRUGATED STRUCTURE AND WEARABLE ITEM INCLUDING THE SAME

CROSS-REFERENCE TO RELATED APPLICATION(S)

This application claims benefit of priority to Korean Patent Application No. 10-2016-0143542 filed on Oct. 31, 2016 in the Korean Intellectual Property Office, the disclosure of which is incorporated herein by reference in its entirety.

BACKGROUND

1. Field

The present disclosure relates to a fibrous energy harvesting device having a corrugated structure and a wearable item including the same.

This application was derived from research undertaken as a part of a project [Project Number: 1711035203 (R0992-16-1021), Project Title: Energy Harvesting and Wireless Power Transmission for Wearable Devices] to promote and support the University ICT Research Centers by the Ministry of Science, ICT and Future Planning and the Institute for Information & Communications Technology Promotion.

2. Description of Related Art

Due to the depletion of existing fossil fuels and environmental pollution, the development of technologies to secure sustainable and environmentally friendly energy is becoming an important issue. As a solution therefor, energy harvesting, in which electrical energy may be harvested from various types of energy sources, such as friction, vibration, heat, biological processes, and the like, is attracting attention.

In particular, energy harvesting technology using friction as an energy source is an eco-friendly energy capable of converting mechanical energy generated by human motion into electrical energy, and had positive properties in that conversion efficiency is high and miniaturization may be implemented in terms of an energy conversion method.

In the case of energy harvesting using triboelectricity, there may be problems in that an insulating spacer should be provided to maintain a predetermined interval between two electrodes.

In addition, existing devices for energy harvesting have relatively low durability and may be inconvenient to be worn on the human body.

SUMMARY

An aspect of the present disclosure is to provide a fibrous energy harvesting device having a corrugated structure, in which electrical energy may be harvested, without providing an insulating spacer, and flexibility and stretchability may be maintained to significantly reduce the inconvenience that a user may feel in charging a portable device with electricity, and a wearable item including the same.

According to an aspect of the present disclosure, a fibrous energy harvesting device includes a first fiber layer acting as an electrified body for generation of triboelectric energy, and a second fiber layer acting as an electrified body for generation of triboelectric energy. The first fiber layer is attached to an upper surface of the second fiber layer and has a corrugated structure.

According to an aspect of the present disclosure, a wearable item includes a fibrous energy harvesting device. The fibrous energy harvesting device includes a first fiber layer acting as an electrified body for generation of triboelectric energy, and a second fiber layer acting as an electrified body for generation of triboelectric energy. The first fiber layer is attached to an upper surface of the second fiber layer and has a corrugated structure.

BRIEF DESCRIPTION OF DRAWINGS

The above and other aspects, features, and advantages of the present disclosure will be more clearly understood from the following detailed description when taken in conjunction with the accompanying drawings, in which:

FIGS. 2A to 2C illustrate an operational principle of a fibrous energy harvesting device having a corrugated structure according to an exemplary embodiment in the present disclosure;

DETAILED DESCRIPTION

Figure 1:
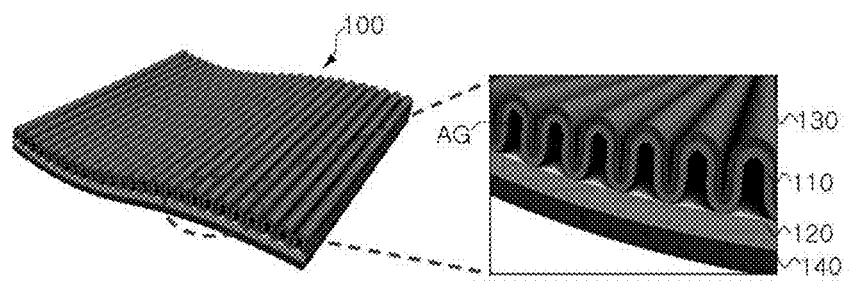
FIG. 1 illustrates a structure of a fibrous energy harvesting device having a corrugated structure according to an exemplary embodiment in the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be construed as being limited by these terms. These terms are only used to distinguish one member, component, region, layer or section from another region, layer or section. Thus, a first member, component, region, layer or section discussed below could be termed a second member, component, region, layer or section without departing from the teachings of the embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is inverted, elements described as "above," or "upper," with regard to other elements, would then be oriented "below," or "lower," with regard to the other elements or features. Thus, the term "above" can encompass both upward and downward orientations, depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape illustrated may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and only a required configuration is proposed herein, but an exemplary embodiment in the present disclosure is not limited thereto.

FIG. 1 illustrates a structure of a fibrous energy harvesting device having a corrugated structure according to an exemplary embodiment.

As illustrated in FIG. 1, a fibrous energy harvesting device 100 according to an exemplary embodiment may include a first fiber layer 110, a second fiber layer 120, a first electrode layer 130, and a second electrode layer 140.

In detail, the first fiber layer 110 and the second fiber layer 120 may be provided to be used as a triboelectrically electrified body, and may be formed of a fibrous polymer. For example, the first and second fiber layers may be woven using various fabrics such as wool, silk, and the like.

One of the first fiber layer 110 and the second fiber layer 120 may function as a positive electrified body, and the other thereof may function as a negative electrified body. A detailed material thereof may be appropriately selected with reference to a triboelectric series.

In detail, according to an exemplary embodiment, the first fiber layer 110 may be attached to an upper surface of the second fiber layer 120 as illustrated in FIG. 1, and may have a corrugated structure.

In detail, the first fiber layer 110 may include peak portions having an air gap (AG) between the peak portions and the second fiber layer 120, and valley portions attached to the second fiber layer 120. The valley portions of the first fiber layer 110 may be attached to the second fiber layer 120 by, for example, stitching.

In the exemplary embodiment of FIG. 1, although the peak portions and the valley portions formed on the first fiber layer 110 are illustrated as being regularly and repeatedly formed in the same form, the peak portions and the valley portions may also be irregularly formed according to an exemplary embodiment.

The first electrode layer 130 may be formed on an upper surface of the first fiber layer 110, and the second electrode layer 140 may be formed on a lower surface of the second fiber layer 120.

The first electrode layer 130 and the second electrode layer 140 may be provided to discharge electrical energy generated by friction between the first fiber layer 110 and the second fiber layer 120 externally, and for example, may be formed using conductive fiber.

The first electrode layer 130 and the second electrode layer 140 may be formed using various methods.

As an example, the first electrode layer 130 may be formed on an upper surface of the first fiber layer 110 via coating, and the second electrode layer 140 may be formed on a lower surface of the second fiber layer 120 via coating.

As another example, the first electrode layer 130 and the first fiber layer 110, and the second electrode layer 140 and the second fiber layer 120 may be attached to each other using a fiber adhesive, respectively.

As another example, the first electrode layer 130 and the first fiber layer 110, and the second electrode layer 140 and the second fiber layer 120 may be attached to each other via stitching, respectively.

FIGS. 2A to 2C illustrate an operational principle of a fibrous energy harvesting device having a corrugated structure according to an exemplary embodiment. FIGS. 3A to 4C illustrate voltages generated by a fibrous energy harvesting device according to various operations.

Hereinafter, the operational principle of a fibrous energy harvesting device having a corrugated structure according to an exemplary embodiment will be described in detail with reference to FIGS. 2A to 2C.

FIG. 2A illustrates a fibrous energy harvesting device in an ordinary state in which external force is not applied thereto, and in this case, a first fiber layer 110 and a second fiber layer 120 may be maintained at a predetermined interval therebetween by an air gap AG.

Then, as illustrated in FIG. 2B, for example, when external force, denoted by "P", is applied to the first fiber layer 110 and the second fiber layer 120 from an upward direction, the first fiber layer 110 and the second fiber layer 120 may be in contact with each other to be electrified.

Subsequently, when the external force is removed, the first fiber layer 110 and the second fiber layer 120 may return to an original state as illustrated in FIG. 2C.

As the processes described above are repeated, triboelectricity charged in the first fiber layer 110 and the second fiber layer 120 may be externally discharged through a first electrode layer 130 and a second electrode layer 140.

Although FIG. 2B only illustrates the external force P acting from an upper part toward a lower part, external force may act in various forms, for example, in a horizontal direction, called stretching, or the like, in the state of FIG. 2A.

FIGS. 3A to 4C illustrate voltages generated by a fibrous energy harvesting device according to various operations.

Figure 3A:
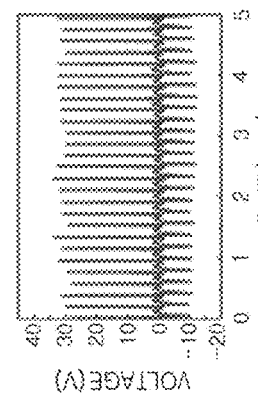
FIGS. 3A to 4C illustrate voltages generated by a fibrous energy harvesting device according to various operations.
Figure 3B:
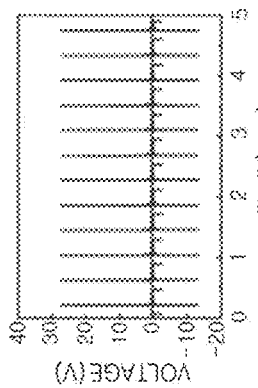
Figure 3C:
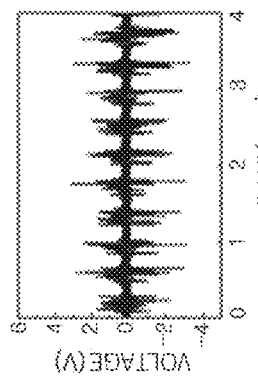

FIG. 3A illustrates a voltage generated when external force (stretching) repeatedly acts in a horizontal direction in the state of FIG. 2A, FIG. 3B illustrates a voltage generated when external force repeatedly acts from an upward direction in the state of FIG. 2A, and FIG. 3C illustrates a voltage generated when an upper portion of the fibrous energy harvesting device 100 is repeatedly rubbed in a state in which it is pressed by a non-conductive object such as a glass plate or the like in the state of FIG. 2A.

Figure 4A:
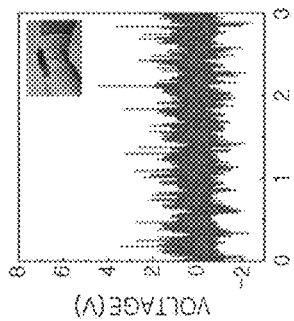
Figure 4B:
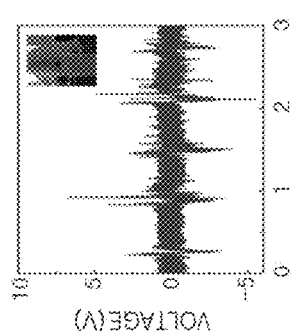
Figure 4C:
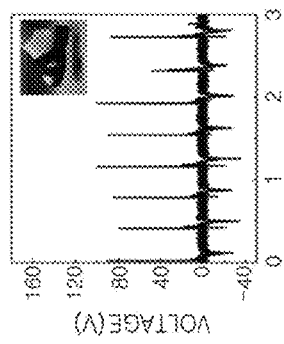

FIG. 4A illustrates a voltage generated when the fibrous energy harvesting device is attached to a user's wrist and the wrist is repeatedly moved up and down. FIG. 4B illustrates a voltage generated when the fibrous energy harvesting device is attached to a side of a user wearable item, and then, the attached fibrous energy harvesting device is repeatedly rubbed while the arm is repeatedly moved back and forth. FIG. 4C illustrates a voltage generated when the fibrous energy harvesting device is placed on the ground and a user repeatedly steps on the fibrous energy harvesting device with a shoe.

As illustrated in FIGS. 3A to 4C, it can be seen that electrical energy may be harvested in the form of a voltage when external force is repeatedly applied. The electrical energy harvested as described above may be used to charge a battery.

The fibrous energy harvesting device described above may have a form attachable to a place at which external force may act by movement of the human body, for example, to the wrist, the elbow, a bottom of a user shoe, or the like. In this case, the fibrous energy harvesting device may be manufactured to have a predetermined size and may be installed in a form attachable to a wearable item such as pants or shirts or a bottom of a shoe. Alternatively, the fibrous energy harvesting device may constitute the entirety or a portion of a wearable item.

Figure 5:
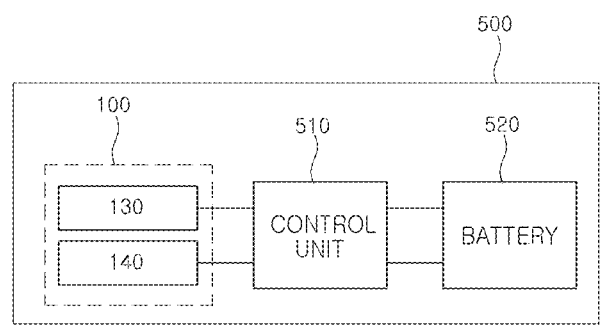
FIG. 5 is a block diagram of a charging apparatus using a fibrous energy harvesting device according to an exemplary embodiment in the present disclosure.

FIG. 5 is a block diagram of a charging apparatus 500 using a fibrous energy harvesting device according to an exemplary embodiment.

As illustrated in FIG. 5, the charging apparatus 500 may include a fibrous energy harvesting device 100, a control unit 510, and a battery 520.

According to the configuration as described above, triboelectricity may be generated in the first electrode layer 130 and the second electrode layer 140 of the fibrous energy harvesting device 100. The control unit 510 may charge the battery 520 with the triboelectricity generated as described above.

As described above, according to an exemplary embodiment, by providing one of two fiber layers, functioning as an electrified body for generation of triboelectricity, with a corrugated structure, electrical energy may be harvested without providing an insulating spacer, and flexibility and stretchability may be maintained to significantly reduce the inconvenience that a user may feel while charging a portable device with electricity.

Although the exemplary embodiment described above illustrates that objects to which energy harvesting may be applied are shoes and pants, it is only to describe the exemplary embodiment. Thus, various embodiments in the present disclosure may be applied to various wearable items in various forms.

As set forth above, according to an exemplary embodiment, by providing one of two fiber layers, serving as an electrified body for generation of triboelectricity, with a corrugated structure, electrical energy may be harvested without providing an insulating spacer, and flexibility and stretchability may be maintained to significantly reduce the inconvenience that a user may feel while charging a portable device with electricity.

While exemplary embodiments have been shown and described above, it will be apparent to those skilled in the art that modifications and variations could be made without departing from the scope of the present invention as defined by the appended claims.

What is claimed is:

1. A fibrous energy harvesting device, comprising:
   a first fiber layer acting as an electrified body for generation of triboelectric energy; and
   a second fiber layer which is flat and acts as an electrified body for generation of triboelectric energy,
   wherein the first fiber layer has a corrugated structure having peak portions having an air gap with the second fiber layer, and valley portions attached to the second fiber layer,
   wherein the first fiber layer is in contact with the second fiber layer when vertical external force is applied to the first and second fiber layers, and the first fiber layer and the second fiber layer are spaced apart from each other by an air gap when vertical external force is not applied thereto, to generate triboelectricity, and
   wherein the valley portions of the first fiber layer and the second fiber layer are attached to each other using stitching.

2. The fibrous energy harvesting device of claim 1, further comprising:
   a first electrode layer disposed on an upper surface of the first fiber layer; and
   a second electrode layer disposed on a lower surface of the second fiber layer.

3. The fibrous energy harvesting device of claim 2, wherein the first electrode layer and the second electrode layer are comprised of a conductive fiber.

4. The fibrous energy harvesting device of claim 1, wherein one of the first fiber layer and the second fiber layer functions as a positive electrified body, and the other of the first fiber layer and the second fiber layer functions as a negative electrified body.

5. A wearable item comprising:
   a fibrous energy harvesting device,
   wherein the fibrous energy harvesting device includes a first fiber layer acting as an electrified body for generation of triboelectric energy; and a second fiber layer which is flat and acts as an electrified body for generation of triboelectric energy,
   the first fiber layer has a corrugated structure having peak portions having an air gap with the second fiber layer, and valley portions attached to the second fiber layer,
   the first fiber layer is in contact with the second fiber layer when vertical external force is applied to the first and second fiber layers, and the first fiber layer and the second fiber layer are spaced apart from each other by an air gap when vertical external force is not applied thereto, to generate triboelectricity, and
   wherein the valley portions of the first fiber layer and the second fiber layer are attached to each other using stitching.

6. The wearable item of claim 5, wherein the fibrous energy harvesting device further comprises:
   a first electrode layer disposed on an upper surface of the first fiber layer; and
   a second electrode layer disposed on a lower surface of the second fiber layer.

7. The wearable item of claim 6, wherein the first electrode layer and the second electrode layer are comprised of a conductive fiber.

8. The wearable item of claim 5, wherein one of the first fiber layer and the second fiber layer functions as a positive electrified body, and the other of the first fiber layer and the second fiber layer functions as a negative electrified body.

\* \* \* \* \*